United States Patent
George et al.

(10) Patent No.: US 11,248,943 B2
(45) Date of Patent: Feb. 15, 2022

(54) MOBILE FUEL MEASUREMENT SYSTEM

(71) Applicant: Nautical Control Solutions, LP, Spring, TX (US)

(72) Inventors: Anthony George, The Woodlands, TX (US); Thomas Smith, Houston, TX (US); Brian Doyle, Conroe, TX (US); Emerson Ornstein, Houston, TX (US)

(73) Assignee: Nautical Control Solutions, LP, Spring, TX (US)

( * ) Notice: Subject to any disclaimer, the term of this patent is extended or adjusted under 35 U.S.C. 154(b) by 0 days.

(21) Appl. No.: 17/003,744

(22) Filed: Aug. 26, 2020

(65) Prior Publication Data

US 2021/0063218 A1    Mar. 4, 2021

Related U.S. Application Data

(60) Provisional application No. 62/893,585, filed on Aug. 29, 2019.

(51) Int. Cl.
*G01F 1/84* (2006.01)
*B67D 7/08* (2010.01)

(52) U.S. Cl.
CPC ...... *G01F 1/84* (2013.01); *B67D 7/08* (2013.01)

(58) Field of Classification Search
CPC ...... B67D 7/04; B67D 7/08; B67D 2007/043; B67D 2007/044; G01F 1/84
USPC ...................................................... 141/231
See application file for complete search history.

(56) References Cited

U.S. PATENT DOCUMENTS

| | | | | |
|---|---|---|---|---|
| 5,265,651 A * | 11/1993 | Perkins | ............... | B65D 88/34 141/1 |
| 5,609,191 A * | 3/1997 | Topping | ............... | B67D 7/002 137/565.17 |
| 6,179,986 B1 * | 1/2001 | Swette | ............... | A23L 3/003 204/228.6 |
| 6,471,487 B2 * | 10/2002 | Keilty | ............... | G05D 7/0688 417/26 |
| 8,393,360 B2 * | 3/2013 | Brakefield | ............... | B67D 7/16 141/67 |
| 9,086,238 B2 * | 7/2015 | Valente | ............... | B01D 53/78 |
| 9,530,290 B2 * | 12/2016 | Hutchinson | ............... | G08B 5/36 |
| 9,771,523 B2 * | 9/2017 | Norling | ............... | C10G 53/12 |

(Continued)

OTHER PUBLICATIONS

Declaration of Anthony George with exhibits dated Oct. 7, 2021, 31 pages.

(Continued)

*Primary Examiner* — Timothy L Maust
(74) *Attorney, Agent, or Firm* — Lewis & Reese, PLLC

(57) ABSTRACT

A mobile fuel monitoring system (MMU) is disclosed. The fuel monitoring system may be skid mounted and is configured to monitor fuel transfers between a fuel source and a vessel, such as a ship. The disclosed MMU is a stand-alone, self-contained unit that can be easily moved from place to place. The MMU is configured to monitor and remotely report custody transfers of fuel performed at any location. Parameters of the fuel transfer operation, such as the amount of fuel transferred, the flow rate, the fuel density, and fuel temperature can be monitored and alarms may be issued if any of the parameters are out of specification. The parameter values may be transmitted to a remote location, for example, via a satellite link.

13 Claims, 4 Drawing Sheets

(56) References Cited

U.S. PATENT DOCUMENTS

| | | | |
|---|---|---|---|
| 10,384,927 B2* | 8/2019 | Mathers | B67D 7/04 |
| 10,626,857 B1* | 4/2020 | Suntup | B67D 7/62 |
| 10,759,649 B2* | 9/2020 | Haile | B67D 7/04 |
| 10,882,732 B2* | 1/2021 | Haile | B67D 7/0401 |
| 2010/0217536 A1 | 8/2010 | Casimiro et al. | |
| 2011/0220213 A1* | 9/2011 | Cabrera | G01F 1/8413 |
| | | | 137/4 |
| 2014/0249011 A1* | 9/2014 | Mense | B04B 5/10 |
| | | | 494/13 |
| 2018/0285847 A1* | 10/2018 | Pier | B67D 7/40 |

OTHER PUBLICATIONS

"Fuel Monitoring—Keeping Mobile," Bunkerspot, vol. 15, No. 3, Jun./Jul. 2018, 4 pages.

* cited by examiner

MOBILE FUEL MEASUREMENT SYSTEM

CROSS REFERENCE TO RELATED APPLICATIONS

This is a non-provisional application of U.S. Provisional Patent Application Ser. No. 62/893,585, filed Aug. 29, 2019, which is incorporated herein by reference, and to which priority is claimed.

FIELD OF THE INVENTION

The present application relates to systems for measuring and tracking the amount of fuel transferred to a vessel, such as a ship.

INTRODUCTION

In fuel-intensive businesses, such as shipping, fuel costs can exceed payroll expenses for the business operation. As a consequence, monitoring the amount and quality of fuel transferred to a vessel, such as a ship, during a fueling operation is important. Onboard systems for monitoring fuel transfer operations are known in the art. However, there is a need in the art for mobile systems for monitoring fuel transfer operations.

SUMMARY

Disclosed herein is an apparatus for monitoring fuel transfer, the apparatus comprising: a mobile skid having components mounted thereon, wherein the components comprise: an inlet configured to receive a fuel stream, an air eliminator configured to remove air from the fuel stream, wherein the air eliminator provides an air-rich stream and an air-depleted fuel stream, a recirculation tank configured to: receive the air-rich stream, separate liquids entrained in the air-rich stream, and recirculate the separated liquids to the air eliminator, a mass flow meter configured to measure the mass flow of the air-depleted fuel stream. According to some embodiments, the mass flow meter is a Coriolis meter. According to some embodiments, the mass flow meter is further configured to measure the density of the air-depleted fuel stream. According to some embodiments, the components further comprise a temperature sensor configured to measure the temperature of the air-depleted fuel stream. According to some embodiments, the apparatus further comprises a user interface configured to display one or more parameters relating to the fuel transfer. According to some embodiments, the one or more parameters are selected from the group consisting of total fuel transferred, flow rate, fuel temperature, and fuel density. According to some embodiments, the apparatus further comprises a transceiver configured to transmit one or more parameters relating to the fuel transfer to a remote location.

DESCRIPTION

Aspects of this disclosure relate to a mobile measurement unit (MMU) configured to monitor fuel transfers between a fuel source and a vessel, such as a ship. The disclosed MMU is a stand-alone, self-contained unit that can be easily moved from place to place. The MMU is configured to monitor and remotely report custody transfers of fuel performed at any location.

Figure 1:
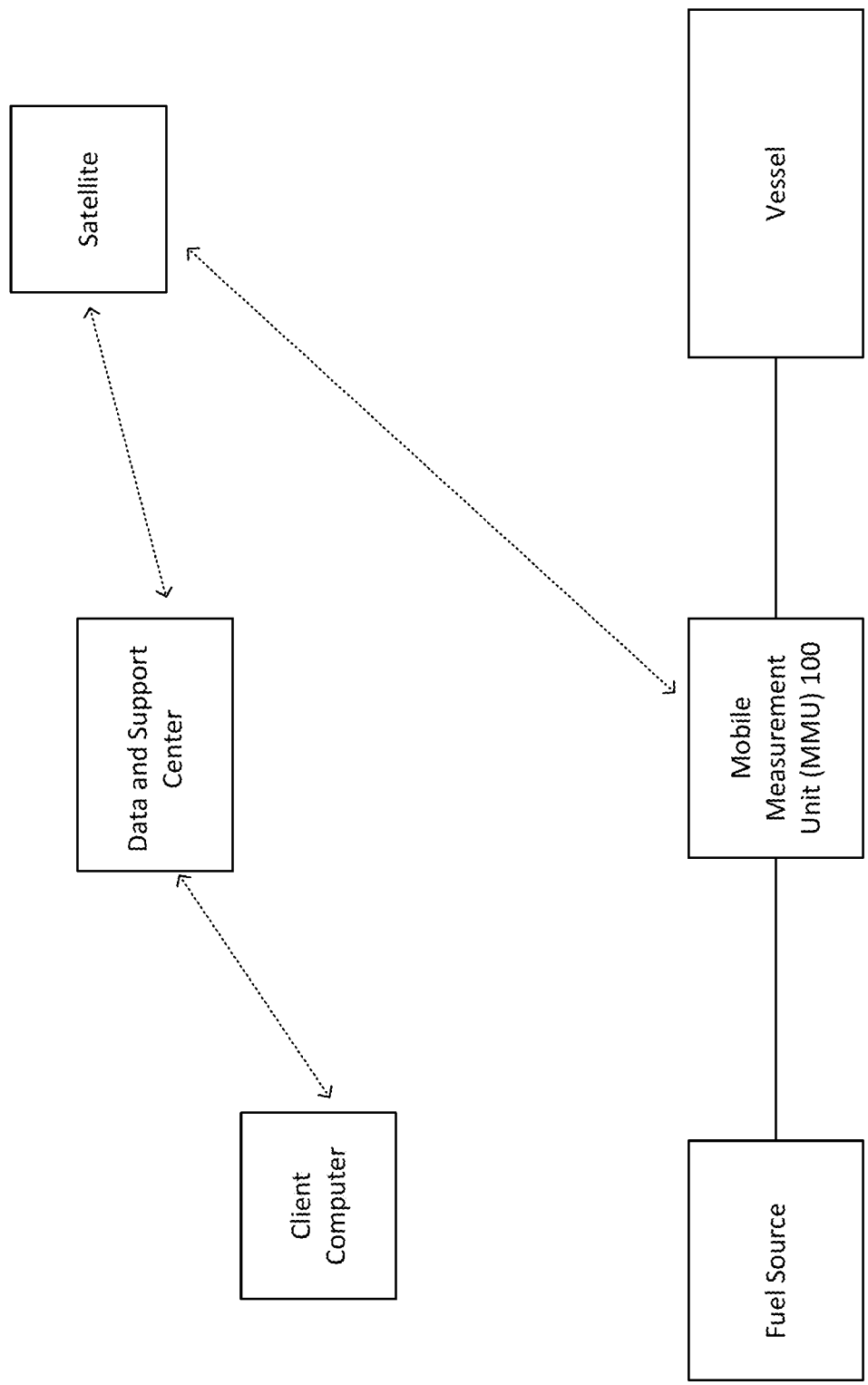
FIG. 1 shows a system for monitoring a fuel transfer operation.

FIG. 1 illustrates the use of an MMU 100 in a fuel transfer operation. Fuel is pumped from a fuel source to an inlet of the MMU 100. Depending on the nature of the fueling operation, the fuel source may be a tanker truck, a fuel tank, a fueling barge, or the like. Fuel flows through the MMU 100 and to the vessel through a hose connecting an outlet of the MMU to a tank of the vessel. The vessel may generally be any kind of vehicle. The embodiments described in this disclosure generally relate to bunkering operations of a ship, but the vehicle could also be an aircraft, a truck, heavy equipment, or the like. The fuel may be any type of liquid fuel, such as gasoline, heavy fuel oil, marine gas oil, aviation fuel, or the like. Because of its compact, self-contained, and stand-alone configuration, the MMU may be positioned at any safe location for monitoring the fuel transfer. For example, the MMU may be positioned on a dock, on a barge, or in the bed of a truck, depending on the nature of the fueling operation.

The MMU 100 is configured to monitor data related to the fuel transfer. For example, the MMU may monitor the mass flow, density, and temperature of the fuel as the fuel flows through the MMU. The monitored data may be collected and stored in a memory of the MMU and/or may be transmitted to a remote location. According to some embodiments, the MMU is configured to transmit data via an uplink to a satellite system, such as the IRIDIUM satellite constellation, for example. The monitored data may be transmitted to a data center/support center and be made available to stakeholders of the fuel transfer process, who may log into the data/support center using a client computer. The MMU 100 may be configured with an integrated GPS transceiver, to provide a record of the location of the MMU.

Figure 2:
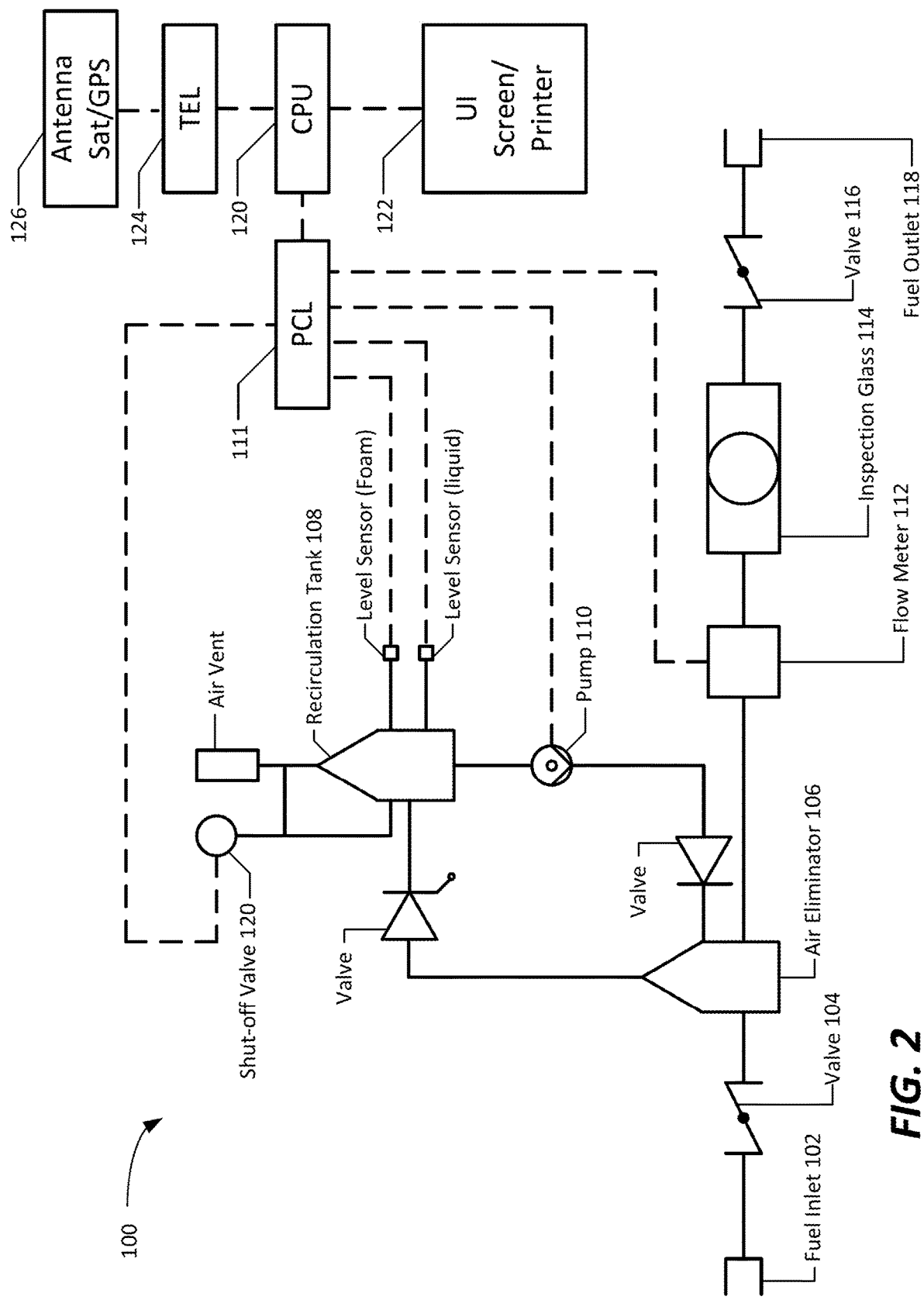
FIG. 2 shows a schematic of components of a mobile fuel measurement unit (MMU).

FIG. 2 shows components of an embodiment of an MMU 100. In FIG. 2, solid lines represent piping and/or hoses and dashed lines represent electrical wiring. The MMU has an inlet connector 102 for connecting to a fuel line from the fuel source and a valve 104 for opening/closing fuel flow. The valve 104 may be a butterfly valve, for example. The fuel is routed to an air eliminator 106 to alleviate measurement inaccuracies associate with biphasic flow. Closed-loop foam recirculation may be provided to the air eliminator 106 using a recirculation tank 108 to capture foam from the air eliminator and a pump 110 to pump foam and/or entrained liquids back to the air eliminator. The pump 110 may be a rotary pump, for example, and may be controlled by a programmable logic controller (PLC) 111 based on measurements of one or more level sensors associated with the recirculation tank. For example, in the illustrated embodiment, the recirculation tank 108 is equipped with a first level sensor calibrated to detect a fluid level and a second level sensor calculated to detect foam. The PLC 111 can be programmed such that, when either the liquid and/or the foam in the recirculation tank reaches a threshold level, the contents of the recirculation tank are recirculated to the air eliminator 106. The flow of fluids in the piping between the air eliminator 106 and the recirculation tank 108 may be regulated using one or more valves. In the illustrated embodiment, a one-way float valve is disposed in the piping from the air eliminator tank to the recirculation tank and another one-way valve is disposed on the return line to the air eliminator.

Fuel exiting the air eliminator 106 is routed to a mass flow meter 112. According to some embodiments, the mass flow meter is a Coriolis meter, which may be configured to measure the mass flow, volume flow, density and temperature of the fuel. Mass flow meters, such as the Coriolis mass flow meter 112 are most accurate when measuring a single-phase flow only. In other words, measurements are more accurate when the fuel is free of air. The combination of the air eliminator 106, the recirculation tank 108 and the flow meter 112 provides a highly accurate, error-free measurement system because the flow to the meter is preconditioned to be free of air. The air elimination system may be configured as a closed-loop system by reinjecting any gas that is separated from the flow back into the flow stream or back into the recirculation tank 108, as shown in FIG. 2.

The MMU may also be equipped with an inspection glass 114 to allow visual verification of the fluid flow through the piping. An exit valve 116 can be used to turn on/off the fluid exiting the MMU via the fuel outlet 118.

The MMU 100 comprises a central processing unit (CPU) 120 that executes instructions for controlling the electronic operations of the MMU. The CPU can execute instruction stored on a non-transitory computer readable medium, such as magnetic, optical, or solid-state memories. The CPU may be a commercially available microprocessor, such as an INTEL CORE series processor, or may be an application-specific integrated circuit (ASIC).

The CPU of the illustrated MMU interfaces with one or more programmable logic controllers (PLCs) 111 configured to receive data generated by the various sensors and meters of the MMU and to control the operation of the various controllable systems of the MMU. Examples of suitable PLCs include any input/output based controller, such as a Phoenix Contact Inline controller (Phoenix Contact, Middletown, Pa.) or a Siemens SIMATIC controller (Siemens, Munich Germany). As described above, the PLC 111 can receive data indicating measurements made by the level sensors of the recirculation tank 108 and, based on executed logic, control the pump 110 to recirculate the contents of the recirculation tank back to the air eliminator 106. The PLC can also control the venting of air contained within recirculation tank, for example, by actuating a motorized shut-off valve 120. The PLC is also configured to receive data from the flow meter 112.

The MMU 100 may be equipped with one or more user interface (UI) devices 122. According to some embodiments, the MMU features an interactive display, such as a touch screen. The display may be configured to display the data measured during the fuel transfer operation, as described in more detail below. The MMU may also include a printer for printing an immediate transaction record of the fuel transfer. The MMU may also include one or more alarms, such as a siren and/or strobe light, for example, which may be automatically activated in the case that there is an anomaly or fault detected during the fuel transfer operation. The alarm may be triggered based on a detected change in the measured density, for example, which may indicate air or water has been added to the fuel, either accidentally or purposefully for manipulating fuel inventory.

The MMU 100 may also be equipped with one or more telemetry modules 124 configured to transmit the measured data from the MMU at the site of the fuel transfer operation to a remote location. According to some embodiments, the MMU is configured with a transceiver for communicating the data to a satellite. For example, the MMU may include appropriate antennas 126 for transmitting the measured data using an IRIDIUM satellite data communication network. The data may be compressed and/or encrypted prior to transmission. The MMU may also be equipped with a global positioning system (GPS) so that the location of the MMU may be determined and recorded.

Figure 3A:
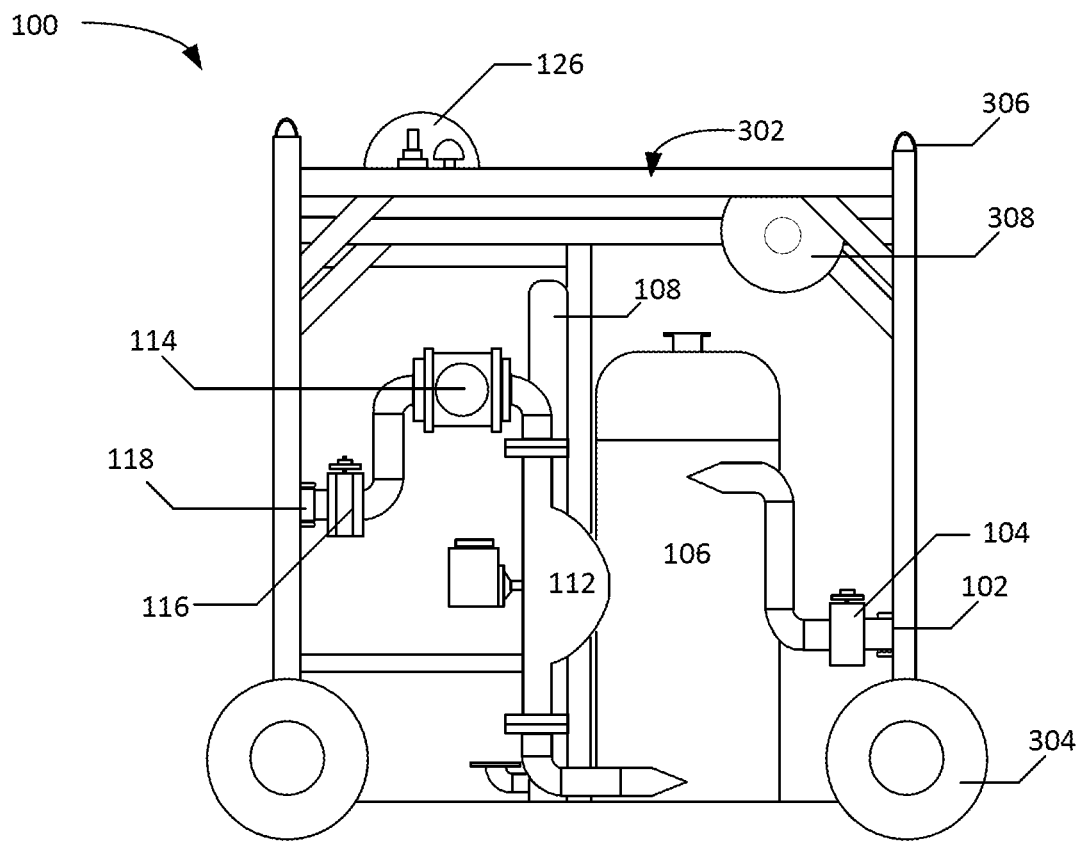
FIGS. 3A and 3B show aspects of a skid-mounted MMU.
Figure 3B:
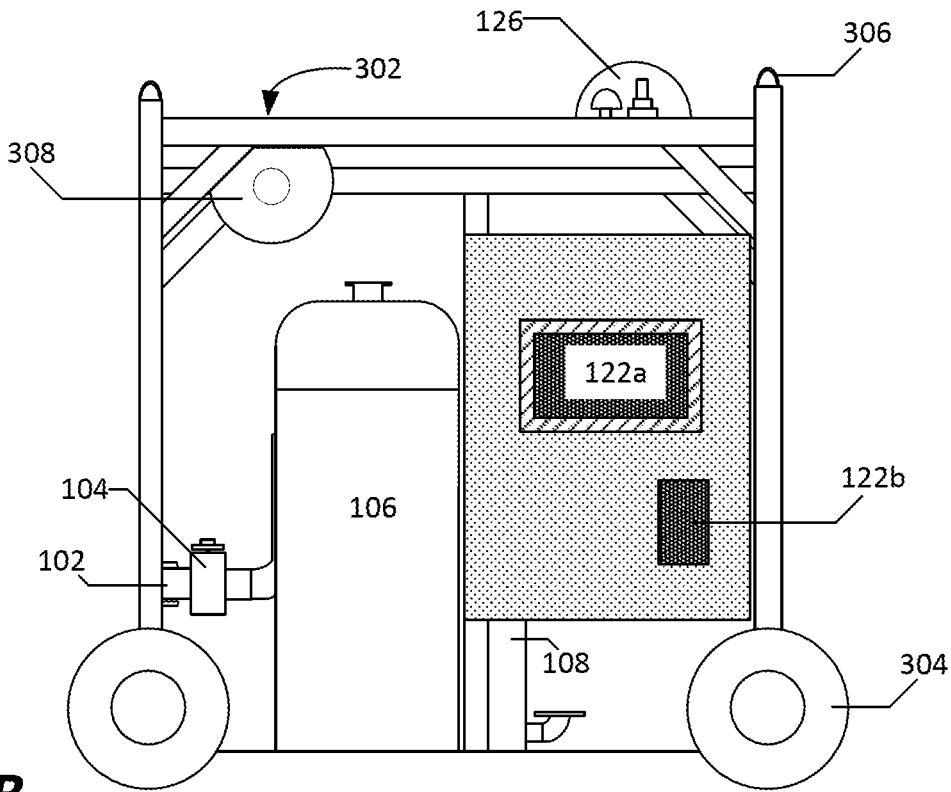

FIGS. 3A and 3B illustrate an embodiment of an MMU 100 configured as a mobile unit. The components described above in reference to FIG. 2 are configured on a mobile skid 302. According to some embodiments, the mobile skid 302 is made from a steel frame. The skid may be equipped with wheels 304 and/or lifting hooks 306 for easy movement. The MMU is typically powered by electrical power, e.g., 240 V power at the operation site, and may be equipped with a back-up battery (e.g., a rechargeable battery) for providing power in the absence or failure of local power. The frame may be equipped with a power cable reel 308 for managing a power cable. The embodiment of the MMU 100 shown in FIGS. 3A and 3B is equipped with a touch screen 122a and a ticket printer 122b, as UI components.

Embodiments of the disclosed MMU 100, as illustrated in FIGS. 3A and 3B, provide a compact, self-contained, and easily transportable apparatus for monitoring fuel transfer operations. According to some embodiments, the MMU may occupy a volume of 10 $m^3$ or less. According to some embodiments, the MMU may have a length of 1.5-3.5 m, a width of 2-4 m, and a height of 1-2.5 m. Embodiments of the MMU may be easily transportable using a truck, fork lift, wench truck, or the like. Embodiment of the MMU may have a weight of less that 2000 kg, or less than 1500 kg.

Figure 4:
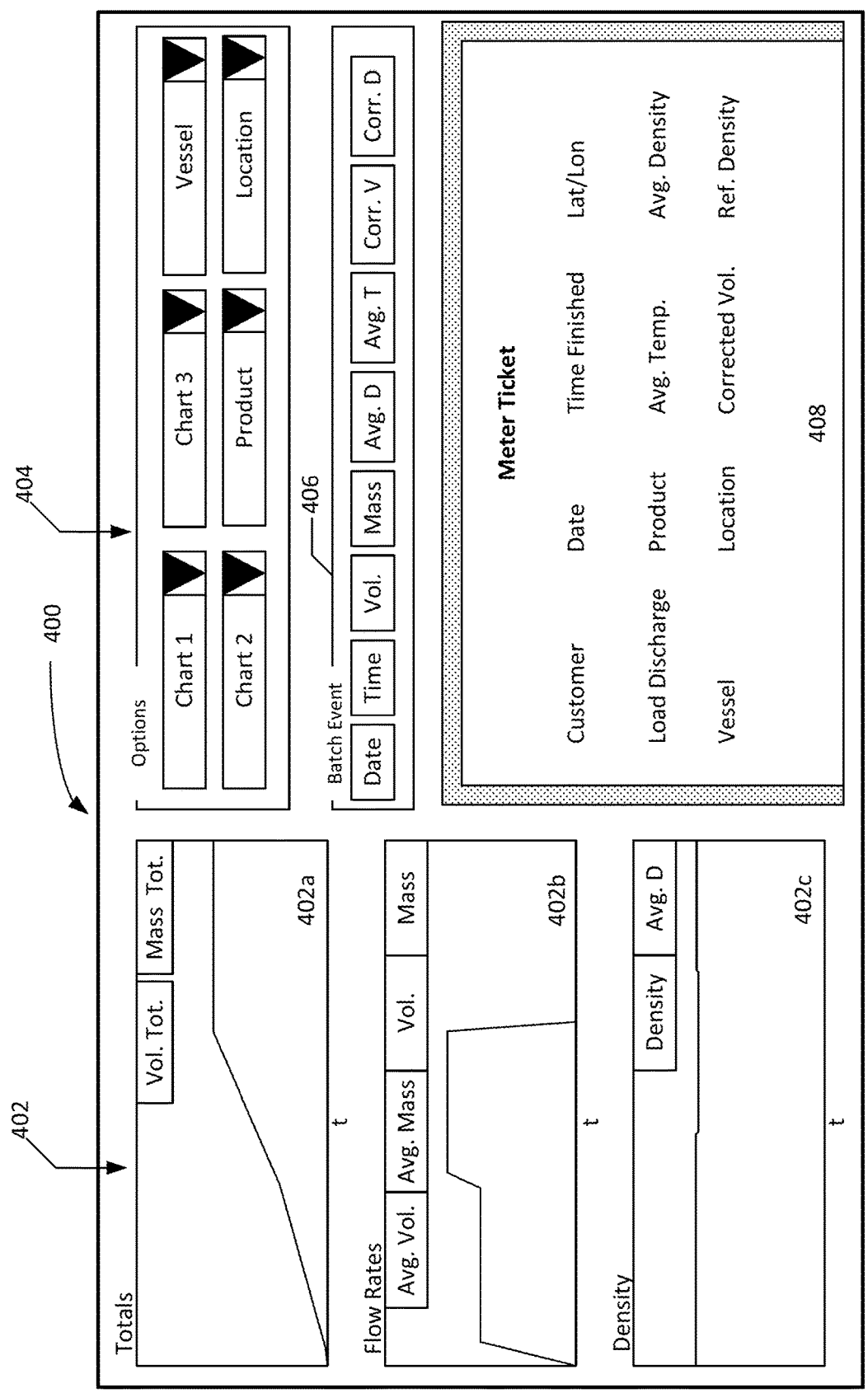
FIG. 4 shows a graphical user interface (GUI) configured to display parameters related to a fuel transfer operation.

During a fuel transfer operation using the MMU 100, the CPU (120, FIG. 2) of the MMU executes instructions that configure the MMU to monitor, store, display, and/or transmit various measured parameters of the fuel transfer. For example, relevant parameters relating to the fuel transfer operation may be displayed in real time on the touch screen 112a of the MMU. FIG. 4 illustrates an embodiment of a visually pleasing graphical user interface (GUI) 400 that may be displayed on the touch screen 122a.

The GUI 400 may contain one or more graphs (i.e., charts) 402 configured to display parameters relating to the fuel transfer operation as a function of time. Each of these parameters can be determined based on the measurements of the mass flow meter (112, FIG. 2), either as a directly measured value or by calculation based on the measured value. For example, the illustrated GUI 400 contains a graph 402a, that shows a running total of fuel transferred as a function of time. The amount of fuel can be displayed in units of volume or in units of mass. The graph 402b shows the flow rate as a function of time and may be displayed in units of volume or mass per unit time (e.g., per hour), and/or as averages of those values. The graph 402c shows the density of the fluid being transferred as a function of time.

The GUI 400 may provide selectable options 404, for example as drop-down menus, for configuring the GUI or for selecting other parameters or information relating to the fuel transfer operation. The illustrated GUI has options for selecting the configurations of the graphs (Charts 1, 2, and 3), selecting the vessel involved in the fuel transfer operation, selecting the location, and selecting the product being transferred (e.g., fuel oil, diesel, etc.).

The GUI 400 may display batch data 406 relating the fuel transfer operation, for example, date, time, volume/mass of fuel transferred, average density, average temperature, and corrected values of volume and density (based on temperature). The GUI 400 may also display a meter ticket 408 listing these and/or other information items relating to the transfer. As mentioned above, the MMU may be configured with a printer for printing such as meter ticket.

As noted above, the MMU 100 can be configured to transmit information related to the fuel transfer operation to a remote location, for example, via satellite communication. Thus, the information provided in the GUI 400 can also be accessed remotely. According to some embodiments, the information reflected in the GUI 400 is periodically updated (e.g., every 15 minutes) and transmitted. Alternatively, "raw" measurement data from the sensor(s) of the MMU may be transmitted and processed at the remote location.

Referring again to FIG. 1, the data and parameters measured during a fuel transfer operation may be continuously monitored and transmitted during the operation to a remote location. According to some embodiments, the data is transmitted to a data/support center. The parameters related to the fuel transfer operation may be stored at the data/support center for future access by interested stake holders and/or the stake holders may connect to the data/support center using a client computer to access the monitoring data in real time during the transfer operation. The data/support center may also monitor the fuel transfer operation and electronically issue alerts to interested stake holders, for example, in the event that an error or anomaly is detected during the transfer operation.

While the invention herein disclosed has been described in terms of specific embodiments and applications thereof, numerous modifications and variations could be made thereto by those skilled in the art without departing from the scope of the invention set forth in the claims.

What is claimed is:

1. An apparatus for monitoring fuel transfer, the apparatus comprising:
   a mobile skid having components mounted thereon, wherein the components comprise:
   an inlet configured to receive a fuel stream,
   an air eliminator configured to remove air from the fuel stream, wherein the air eliminator provides an air-rich stream and an air-depleted fuel stream,
   a recirculation tank configured to: receive the air-rich stream, separate liquids entrained in the air-rich stream, and recirculate the separated liquids to the air eliminator, wherein the recirculation tank is configured with one or more level sensors configured to sense a level of contents within the recirculation tank,
   a controller configured to use the sensed level of contents within the recirculation tank to control recirculating the separated liquids from the recirculation tank to the air eliminator, and
   a mass flow meter configured to measure the mass flow of the air-depleted fuel stream.

2. The apparatus of claim 1, wherein the mass flow meter is a Coriolis meter.

3. The apparatus of claim 1, wherein the mass flow meter is further configured to measure the density of the air-depleted fuel stream.

4. The apparatus of claim 1, wherein the components further comprise a temperature sensor configured to measure the temperature of the air-depleted fuel stream.

5. The apparatus of claim 1, further comprising a user interface configured to display one or more parameters relating to the fuel transfer.

6. The apparatus of claim 5, wherein the one or more parameters are selected from the group consisting of total fuel transferred, flow rate, fuel temperature, and fuel density.

7. The apparatus of claim 1, further comprising a transceiver configured to transmit one or more parameters relating to the fuel transfer to a remote location.

8. The apparatus of claim 1, wherein the one or more level sensors is configured to sense a liquid level.

9. The apparatus of claim 1, wherein the one or more level sensors is configured to sense a foam level.

10. The apparatus of claim 1, wherein controlling recirculating the separated liquids from the recirculation tank to the air eliminator comprises activating a pump based on readings of the one or more level sensors.

11. The apparatus of claim 1, wherein the recirculation tank is configured with an air vent configured to vent air contained within the recirculation tank.

12. The apparatus of claim 11, further comprising a shut-off valve configured to control the air vent.

13. The apparatus of claim 12, further comprising a programmable controller configured to control the shut-off valve.

* * * * *